United States Patent [19]

Coillet

[11] 4,392,959
[45] Jul. 12, 1983

[54] PROCESS FOR STERILIZATION AND REMOVAL OF INORGANIC SALTS FROM A WATER STREAM

[76] Inventor: Dudley W. Coillet, 319 Trapelo Rd., Belmont, Mass. 02178

[21] Appl. No.: 263,869

[22] Filed: May 15, 1981

[51] Int. Cl.³ .............................................. B01D 13/02
[52] U.S. Cl. .................................... 210/638; 210/642; 210/651; 210/713; 210/748
[58] Field of Search ............... 210/638, 639, 642, 644, 210/650–652, 711–714, 716, 737, 748, 774

[56] References Cited

U.S. PATENT DOCUMENTS

| | | | |
|---|---|---|---|
| 3,350,292 | 10/1967 | Weinberger et al. | 210/644 X |
| 4,036,749 | 7/1977 | Anderson | 210/638 |
| 4,160,727 | 7/1979 | Harris | 210/639 |

*Primary Examiner*—Thomas G. Wyse

*Attorney, Agent, or Firm*—Flehr, Hohbach, Test, Albritton & Herbert

[57] ABSTRACT

Inorganic salts are removed from an unpotable water stream, which contains suspended living microorganisms and their debris products, particularly seawater or agricultural field drainage water. Chemicals such as caustic soda and/or chlorine, and derivatives therefrom, sterilize the water and remove from it certain dissolved and suspended constituents. From the sterilized water is separated a more concentrated stream of waste brine containing debris and other suspended materials, and most of the dissolved sodium chloride. From the remaining portion of the water is separated a more concentrated stream of sodium chloride, which is electrolized to provide a source of caustic soda, chlorine, and derivatives therefrom; the less concentrated portion is recovered as a source of potable water.

31 Claims, 2 Drawing Figures

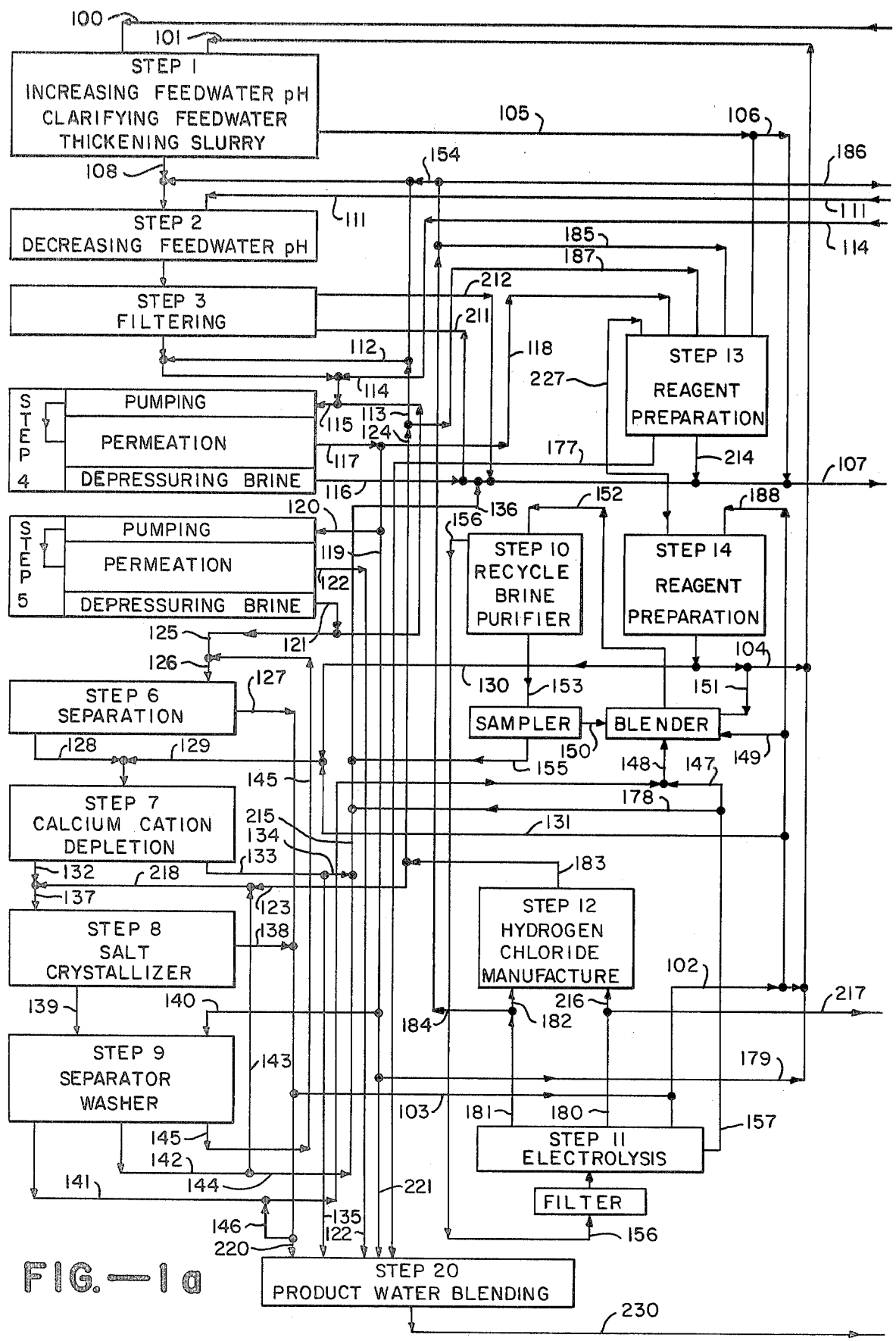
FIG.—1a

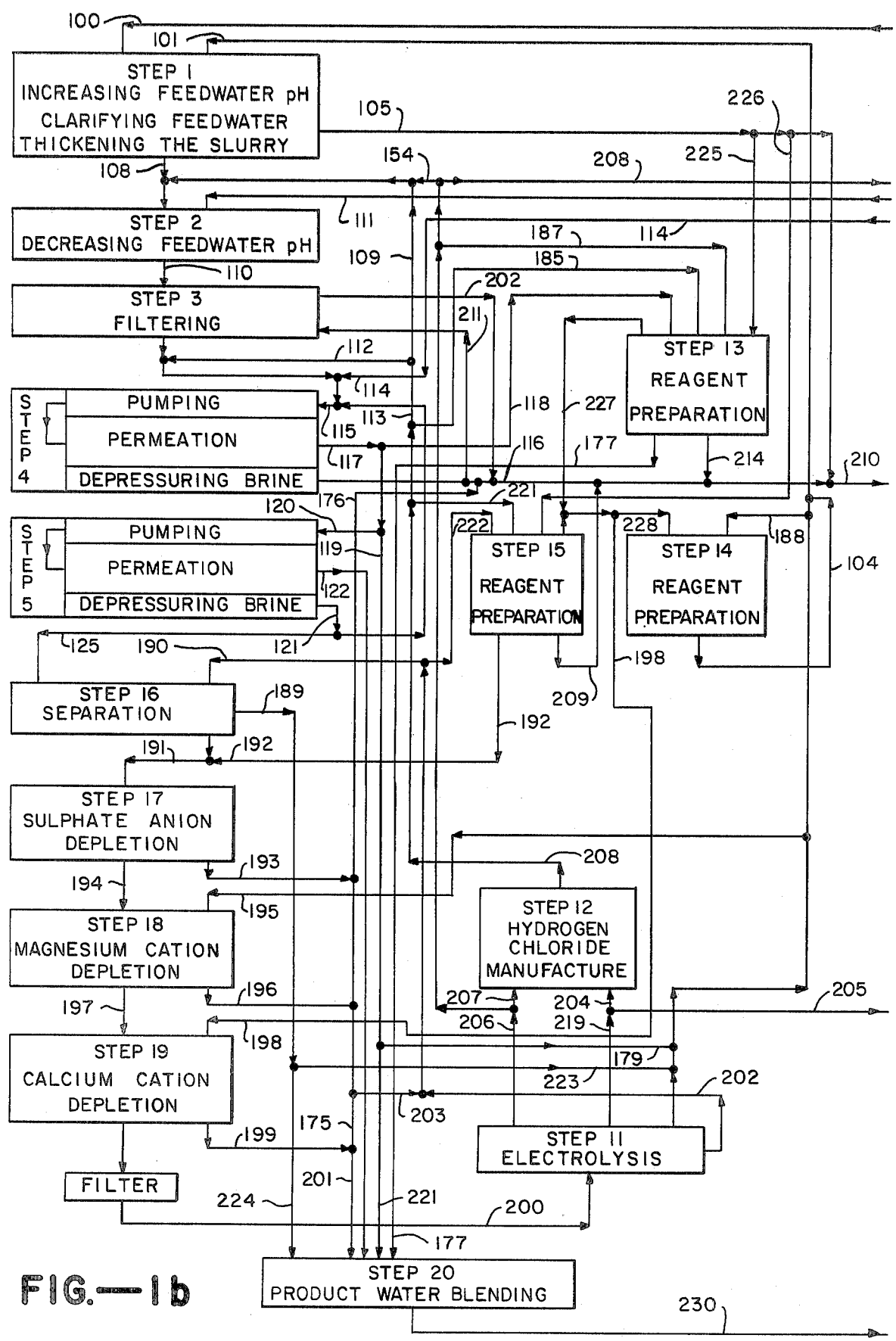
FIG.—1b

PROCESS FOR STERILIZATION AND REMOVAL OF INORGANIC SALTS FROM A WATER STREAM

BACKGROUND OF THE INVENTION

The invention relates to the manufacture of chemicals which sterilize unpotable water, and which are used as additives to the unpotable water during desalination, and to the product (potable) water; specifically using as raw material the waste products of desalination when potable water is a co-product of such chemicals manufacture.

Unpotable water from surface sources (seawater, agricultural field drainage, rivers, ponds, etc.) is sterilized before it is desalinated because microscopic life forms in it form slimes which impede the functioning of desalination equipment. Chemical sterilants, from an external source, the toxic effect of which is neutralized in some suitable way before being discharged to the environment as waste in brine, are preferred for desalination processes involving temperatures no higher than 120° F. (such as reverse osmosis or freeze crystallization of ice). Customarily, chlorine or dissolved hypochlorite anion, which are chemical derivatives of sodium chloride, are added to desalination feedwater, but the survival rate of some slime-forming microorganisms is sufficiently high to coat surfaces, notably of the permeator membranes where slime reduces water production and decreases the useful service life of permeators.

Seawater and agricultural field drainage water, hereinafter referred to as feedwater, contain bicarbonate anion, a dissolved constituent which must be removed for many reasons (for example, it is corrosive to mild steel in the presence of oxygen), but which concentrates in the less-saline product of reverse osmosis. It may be removed from the desalination product only by an extra step, such as aeration of the permeate containing added acid which is at least equivalent to the bicarbonate.

It would be desirable to provide a process which manufactures chemical derivatives of sodium chloride using as raw materials the brine byproduct from desalination, and which uses these derivatives in part to improve the processes of feedwater sterilization, and of bicarbonate removal.

PROCESS FOR THE STERILIZATION AND REMOVAL OF INORGANIC SALTS FROM A WATER STREAM

Objects and Summary of the Invention

It is the primary object of the invention to remove inorganic salts from an unpotable water stream, containing the salts, preferably to produce potable water.

It is a particular object of the invention to provide a process of the above type in which chemicals which are utilized in the said process are manufactured using as raw materials predominantly the salts which are contained in partially desalinated water.

It is another object of invention to form commercial byproducts, such as liquid chlorine, hydrochloric acid, and sodium hydroxide, which are usefully employed in the process, as well as having a useful commercial role when produced in excess. Further objects and features of the invention will be apparent from the following description taken in conjunction with the appended drawings.

In accordance with the above objectives, unpotable and non-sterile water streams, specifically seawater and agricultural field drainage water, are sterilized and partly stripped of inorganic salts by being passed through a sequence of three treatments.

The first treatment sterilizes the feedwater and removes unwanted dissolved and suspended materials therefrom. A high pH is first imparted to the feedwater by the addition at least of sodium hydroxide (produced as outlined hereinbelow), which converts bicarbonate to carbonate and these anions are depleted along with the calcium cations during the ensuing precipitation of calcium carbonate, which is insoluble in the conditions. With bicarbonate substantially depleted, the pH has a value above 10 which can be fatal to microscopic life forms (such as algae) and virus, regardless of their habitat in water, and trace amounts of magnesium hydroxide precipitate in a flocculent form which is highly adsorbent of finely-divided organic debris. Insoluble solids are removed, by settling over a period of 3 hours approximately, followed by filtration. Optionally the temperature of the filtrate may be adjusted up or down, and/or chemicals such as sodium hexametaphosphate are added to assist and improve downstream processing in ways which are well-known and are explained hereinbelow. Then the water is pumped to high pressure and processed by permeation through membranes which separate the feedwater into two streams. One of these streams is a clear concentrate which contains unwanted salts dissolved preferably in a minimum of water to ensure no more feedwater than is necessary undergoes the processing just outlined; this minimizes use of process energy and optimizes the use of equipment. Part of this concentrate is used to clean filters of accumulated debris, another part may be diverted through heat exchangers rejecting waste heat as outlined hereinbelow, before both parts are joined by other process wastes and disposed of at sea.

The other stream arising from this first treatment is the less saline permeate which however contains the salt required as raw material for the manufacture of reagents and chemicals outlined hereinbelow, as well as the salt contained in product water. Part of this product optionally is used to blend with other components as product water; the remainder passes through the second treatment necessary in order to apportion the salt therein between a portion which is blended with the product water of the process and another portion which is required in chemicals manufacture (principally the preparation of reagents used in the process, also some recycle of salt to the feedwater of the first treatment to aid in control over the process, and the discharge of wastes into the brine of the first treatment). A simple proportioning valve would achieve such an objective, but a brackish-water desalination process is preferred because it beneficially directs a less concentrated stream to the product water and a more concentrated stream to chemicals manufacture and recycling. When this function is considered in combination with processes of the third treatment, the second treatment is preferred to be permeation as described hereinbelow; freeze cristallization or electrodialysis could alternatively be used.

The third treatment converts a salt brine product of the second treatment into chemical raw materials which are either needed to prepare the reagents used in the process, or desired as commercial byproducts such as liquid chlorine and sodium hydroxide. The water content of the said salt brine product is separated and used as a component of the blend which is product water, optionally including also minor amounts of salts derived from the third treatment. The sodium chloride and potassium chloride (hereinafter referred to as sodium chloride) contained as dissolved solids in the said salt brine is separated from the other dissolved solids, and then electrolized. Two process varieties are described hereinbelow illustrating how the salt can be separated and converted to reagents and commercial products; these are examples, not intended to be restrictive of the methods which may in practice be used in carrying this invention into practice in accordance with the principles just outlined. The first illustrative process variety results in the separation of solid sodium chloride from an aqueous solution (called mother liquor) containing other dissolved solids and some dissolved sodium chloride. This is preferably accomplished by passing the said salt brine through a separation process (such as a multi-effect evaporator) which removes water predominantly but leaves dissolved inorganic materials in solution, and through a calcium depletion process (such as by carbonation when in the alkaline condition of pH 9.5 approximately followed by removal of the precipitate and acidulation of the clear liquid or by ion exchange using a strong acid resin such as IR120 of Rohm and Haas regenerated with strong sodium chloride solution) prior to the further removal of water such as by boiling which induces the formation of sodium chloride cristals having a form easily separated from the mother liquor (for example by filtration or centrifugation). The purpose of calcium depletion is to prevent the deposition of insoluble calcium solids, particularly calcium sulphate, on heat-exchange surfaces used to boil off water vapor in the common variety of cristallizing evaporator. If the ion exchange method of calcium depletion is used, this preferably precedes separating the salt brine in a multi-effect evaporator; if the precipitation method of calcium depletion is used, it preferably succeeds the separation step. Calcium depletion of the salt brine if used proceeds the step in which sodium chloride is cristallized. The option to omit cristallization of the said salt brine may be exercised when the first treatment operates with sufficiently enhanced calcium rejection (which occurs by choice of pretreatment or by choice of the permeator membranes, or both) and in other circumstances described more fully below.

Without change of principle pure sodium chloride cristals may be prepared from the said salt brine in other ways which are well known (such as by solar evaporation of water and the separation of salt cristals from it), and used in the process. Regardless of the method of harvesting salt cristals from salt brine, the sodium chloride cristals are washed free of surface contaminants using permeate from the first treatment and are added as make-up to a recirculating aqueous electrolyte which is filtered and passes through the electrolizing step, which converts aqueous sodium chloride to sodium hydroxide, chlorine, and hydrogen. The discharged electrolyte contains diminished content of sodium chloride and is recirculated through a brine purifier which prevents accumulation in it of materials injurious to the process of electrolyzing salt; at least this recycle brine purification includes the addition of caustic alkali which precipitates magnesium cations as the insoluble hydroxide, which is removed.

Aqueous mother liquor, from which crystallization of sodium chloride proceeds out of saturated brine, is discharged as waste at rates sufficient to prevent accumulation therein of impurities having an effect on the cristallization process or on the purity of the sodium chloride; otherwise it is recirculated to the cristallizing evaporator. Evaporative cristallizers may be used in combination with eutectic cristallizers (referred to in more detail below), and this combination is preferred for large plants.

In the other method of purifying salt brine from the second treatment, ionic constituents other than sodium chloride form insoluble salts as a result of adding aqueous chemical reagents. Both the precipitated contaminants and the excess chemical reagents are removed as disclosed hereinbelow, and a further less saline water stream is removed from the brine (such as by multi-effect variety of evaporation) so that the sodium chloride content therein becomes almost saturated, which brine recirculates as aqueous electrolyte. This is outlined in detail hereinbelow.

Sodium hydroxide consumed in the first treatment derives at least partly from the third treatment, and also is a raw material for the reagent sodium carbonate, used in the third treatment to precipitate unwanted bivalent cations from brine, and elsewhere in the process as disclosed hereinbelow.

Hydrogen and chlorine are the raw materials for the reagent hydrogen chloride used predominantly in the first treatment to acidulate feedwater, and as raw material for reagents such as calcium chloride which, in the third treatment using chemical separation, depletes the electrolysis brine of unwanted quantities of sulphate anion. Hydrogen chloride is also used to lower the pH of various aqueous streams as disclosed hereinbelow. Chlorine is a raw material used in the preparation of calcium hypochlorite which is a sterilizing reagent in aqueous solution added to product water. Hydrogen is a fuel burned with air in waste heat boilers; waste heat is one energy source used in the third treatment to recover less saline water from brine.

Carbon dioxide gas is released as a result of preparing some reagents and is absorbed as a result of preparing others.

The product water, which is potable or nearly so, is blended using at least the less saline water stream from the second and third treatments. Other materials, which are generated in the process, are preferably added so that the product water meets potable specifications and has other desirable properties. Examples are reagents which (i) impart to the water a sterilizing capability because it contains hypochlorite anion, (ii) protect materials which the water contacts in its use or disposal, because it contains calcium and/or magnesium cations and (iii) correct the pH to the range of potable water (7 to 7.5).

BRIEF DESCRIPTION OF THE DRAWINGS

The drawings are schematic flow diagrams of the process in accordance with the present invention which differ only in the manner of conduct of the third treatment. In 1(a) the electrolyte is prepared from pure salt cristals separated from brine, by cristallizing evaporation using heat supplied in the form of low pressure (30 psig) steam.

In 1(b) brine is purified by methods which include precipitation of contaminants using chemical reagents, and used as electrolyte without the formation of cristals of sodium chloride.

DETAILED DESCRIPTION OF THE PREFERRED EMBODIMENTS

In general, the present process is applicable to the removal of inorganic salts from unpotable water streams containing the salts. It is particularly effective for the treatment of highly saline water such as seawater and also of saline water requiring sterilization but which is unsuited to treatment with customary dosages of chlorine because the habitat, forms, or species of microscopic life and virus therein are protected partly from the action of chlorine, such as in agricultural field drainage water which usually contains algael slimes. As defined herein, the term "feedwater" will designate the water streams to be treated by the present process. The feedwater streams to which the present process is applicable contain a variety of anions to be removed, such as sulphate and bicarbonate, in addition to the prevalent chloride ion. The cations to be removed typically include one or more of the following: calcium, magnesium, iron, and manganese which are multivalent, in addition to the prevalent monovalent sodium ion.

The novelty of the treatment system of this invention resides in the preparation, from waste products of desalination, of reagent materials containing at least caustic soda in one of them, which are used to treat the feedwater bringing about the precipitation of insoluble salts of multivalent cations (thereby depleting these cations in the feedwater) and/or sterilizing the feedwater, as is to be outlined in more detail hereinbelow. For example, bicarbonate if present with calcium is depleted during the process of precipitation of calcium carbonate, the pH of the feedwater rises in the course of this depletion, and the mortality of microscopic life forms and virus increases rapidly as a result. Moreover the consequent suspended organic debris coprecipitates readily with the insoluble solids containing multivalent cations. The pH value in water needs to rise no higher than that at which magnesium hydroxide can precipitate (11 approximately) to provide for particularly effective mortality and removal of microscopic life forms; only trace quantities of magnesium hydroxide need be formed to bring this about.

Processes of the prior art which treat agricultural field drainage add lime to deplete bicarbonate, but as a result there is an increase in the dissolved content of multivalent calcium cations which in the presence of sulphate can limit the yield of a downstream desalination step, otherwise calcium sulphate precipitates as a scale which interferes with desalination. Moreover, the pH (no higher than 10) provides inferior mortality of microscopic life forms, and magnesium hydroxide cannot precipitate to aid absorbtion and removal of suspended organic debris, and other colloidal material such as silica and iron oxide.

Processes of the prior art which treat seawater using reverse osmosis do not remove bicarbonate anions or calcium cations upstream of the permeators. Instead, they clarify the seawater by adding chemical coagulants such as ferric hydroxide or organic polyelectrolytes (described in more detail below) upstream of a filtration process which preferably is achieved using two filter stages in series, and they secure mortality of some life forms such as algae using additions of soluble copper cations and/or of others such as bacteria using additions of chlorine.

In both cases the downstream desalinator cannot achieve so high a yield of less saline material, nor is it economical to achieve such high salt rejection or production of less saline material (accounted as a percentage of feed) in the case where permeation methods are employed to desalinate as is the case with the pretreatment system hereinbelow outlined as being part of the present invention. Moreover, some membrane processes of the prior art which desalinate seawater employ copper cations added to the feedwater as biocide, which results in discharge of brine containing marine pollutant unacceptable to some U.S. regulations governing such discharge because it is toxic to fish in coastal waters; this is avoided with pretreatment processes of the present invention.

Referring specifically to the schematic process illustrations 1(a) and 1(b), there follows hereinbelow a description of the first treatment which is common to both, comprising pretreatment as defined hereinabove, and the desalination of the pretreated water which rejects as waste the unwanted feedwater components.

The feedwater stream 100 is treated in step 1 by adding to it the chemical stream 101 in a well-stirred blending action such as is achieved with a rotating propeller, for example at the suction of a centrifugal feedwater pump. The mixture passes to a clarifier which is a large steel vessel which operates on the principle of gravity separation to produce a slurry containing an insoluble precipitate and thereby yielding a clear liquid as the second product. The preferred vessel type, which is called a clarifier/thickener, also dewaters or thickens the slurry by gravity separation. Stream 101 is derived as shown from the stream 102 which is composed primarily of sodium hydroxide from step 11, plus the distillate stream 103 which is used to produce and/or displace sodium hydroxide from the electrolysis apparatus of step 11. The result of this is the formation of a precipitate of insoluble calcium carbonate and some barium carbonate (hereinafter referred to as calcium carbonate) because bicarbonate anion in the feedwater converts to carbonate anion as the latter is removed by precipitation of calcium carbonate.

Additional carbonate may optionally be added from the stream 104 if it is desired to remove more calcium than the equivalent of bicarbonate in the feedwater. The effect of the removal of calcium and barium cations while the content of magnesium cations is unchanged is to increase the cation concentration ratio of magnesium compared to calcium and barium which permits the permeators of step 4 described below to operate at higher brine concentrations, thus permitting an increased yield of permeate compared to feedwater.

The stream 101 adds to the feedwater sufficient sodium hydroxide to precipitate trace quantities of magnesium hydroxide, and this assists in sterilizing the feedwater because of the high pH at which magnesium hydroxide is formed (10.5 to 11, approximately), and in clarifying the feedwater because of the high absorbency of flocculant magnesium hydroxide which is formed. The stream 105, which is removed from the base of the clarifier/thickener, is a slurry of multivalent solids in feedwater; most of this (106) is disposed of to the waste stream (107) although some (225) is used as explained hereinbelow in step 13.

The stream 108 is the partially clarified supernatant feedwater product of step 1 having a pH of 10.8 (range 9 to 11) approximately; it is blended in step 2 with hydrochloric acid (109) which is a portion of the stream 113 of hydrochloric acid from step 12 described hereinbelow, containing traces of chlorine represented as stream 154. Preferably a portion of 108 is recirculated through a hydrochloric acid gas absorber in step 12 provided for this purpose rejoining stream 108 in an in-line blender; a well-defined quantity of hydrochloric acid gas passes to the absorber in a way described hereinbelow. This method for transfer of acid is capable of great accuracy and reliability, and is well-suited to the larger systems illustrated in the example; any carbon dioxide released by the operation of the absorber passes to the gas-scrubbing tower of step 14 and augments aqueous carbonate supply used for calcium depletion in step 1. For smaller systems aqueous hydrochloric acid from the converter would instead be added by metering pump to the said in-line blender which is the apparatus of step 2.

The acidulated feedwater stream 110 is of considerably reduced pH (in the range 7.8 to 9 approximately) when compared to stream 108 (10.8 approximately). One result of this is the dissolution of traces of suspended multivalent solids which unavoidably remain in the supernatant product of a continuous clarifier; another result is an improved coagulation rate of fine debris materials which remain suspended in stream 110. Optionally additions may be made of an aqueous stream 111 of chemicals described hereinbelow known to be effective (when present in trace quantities) in accelerating the agglomeration, into particles which may be readily filtered in step 3, of fine suspended or colloidal debris materials. Such chemicals include organic polyelectrolytes of the cationic type, such as Cyanamid 515C, and salts of iron forming iron hydroxide are effective. The filtration apparatus of step 3 and its operation is described fully in the example 1 included below.

After filtration, the remainder 112 of the stream 113 of hydrochloric acid is added, which reduces the pH to a value in the range 5 to 6 approximately at which the permeation to be conducted in step 4 most effectively prevents the passage of salt into the permeate. Also an aqueous stream 114 of chemicals—for example, sodium metabisulphite, which removes chlorine, and sodium hexametaphosphate (SHMP), which sequesters calcium making it less available to form an insoluble scale as water is removed through membranes of permeators—may optionally be added to protect the permeators. A stream 124 of brine from step 5 is optionally added; this assists securing the proper control in step 5 over the rate at which salt and water flow into step 6 and of the salt flow to the product water. The mixture 115 passes to step 4 where, using pumps, it attains a pressure of 1000 psi approximately (range 800 to 1200 psi) and, using permeators, is separated into two parts. One part is a highly saline brine stream 116 which passes through a depressuring apparatus, such as a turbine or a valve, and the other is a stream 117 called permeate containing lower salt concentration than either brine or feedwater. The range of salinities used depends upon the feedwater primarily, but also upon operating parameters for permeation. Highest yield of permeate is effected when the extraction rate for brine is just sufficient to prevent the formation of a scale on the membrane surface which impedes further flow of permeate through the membrane. Typical of materials which become insoluble in brine conditions at the surface of the membrane are the sulphates of calcium and barium in the case of seawater, and silica and the sulphate of calcium in the case of fieldwater; in the case of any feedwater, iron hydroxide which could originate from the feedwater, the process, or by corrosion of the equipment in processes of the prior art, and if so contributes to scale, is effectively removed by the alkaline feedwater treatment described hereinabove. Seawater brine contains in excess of 60,000 ppm TDS; seawater permeate (117) contains 400 to 1600 ppm TDS approximately. Corresponding salinity ranges for permeate and brine are lower than this when fieldwater is being processed, but examples of fieldwater vary widely in composition, corresponding salinity ranges for permeate and brine depend upon the details of composition and are meaningful only in relation to a particular example. Streams which recycle salt components in the permeate 117 to the feedwater upstream of step 4, described in detail hereinbelow, assure that specification for potable product water salinity are met while operating step 4 permeation under conditions resulting in high permeate yield. The process of this invention converts most of these recycle salt components either into reagents such as 101 and 109 which are consumed in feedwater preparation, or into products of commerce such as chlorine and chlorine chemicals.

A small portion (118) of the permeate stream 117 is used to dissolve the calcium chloride and hypochlorite chemicals produced in step 13, and convey these via 177 to the product water blend in step 20. Another portion 119 is optionally added directly to the product water (221) or used in the process (140), (179). The remaining portion (120) passes to step 5 unchanged.

The second treatment is represented schematically as step 5, which separates a brine stream 121 and a saline stream 122 from the stream 120 by any suitable method which affords control over the distribution of salt between product water and chemicals manufacture in the third treatment. Common features of the second treatment are the following:

(i) the saline stream 122 passes to step 20; it is an important component of product water.
(ii) the stream 124 is a minor part of the brine production, which recycles to step 4 as shown, to further facilitate control over the flow of salt to the third treatment.
(iii) the brine stream 125, which is the major part of 121 after removal of 124, passes to the third treatment at step 6.

FIGS. 1(a) and 1(b) show the use of reverse osmosis processing for the second treatment in combination with different varieties of the third treatment described below. Other brackish water desalination processes, such as electrodialysis or freeze cristallization, are suitable. These all result in the salinity of 122 being lower, and the salinity of 121 being higher, than the stream 120. The limiting case, in which the salinity of 122 and the salinity of 121 are both equal to 120 because the second treatment is a simple proportioning valve, meets the specifications of the second process without alteration of principle, but is not preferred in the case of seawater for reasons outlined hereinbelow.

The third treatment consists of separating pure sodium chloride from stream 125, and electrolizing the said sodium chloride from an aqueous solution containing it to yield sodium hydroxide, chlorine, and hyrogen. The sequence of processes, steps 6, 7, 8, 9, 10 and 11 of FIG. 1(a), commences after the stream 125 is joined by the stream 145 which is surplus washwater from purified sodium chloride cristals and derives from step 9 in a way to be described hereinbelow. The combined stream 126 passes to a separation step 6, in which water is removed in the form of a less saline stream 127, the amount of which is maximized provided that no cristalline or insoluble product separates from the brine. Step 6 employs multi-effect evaporation, or freeze cristallization of ice to achieve water removal from the recirculating brine; either method requires that heat be rejected, and for this purpose a portion of the brine stream 116 is circulated through the heat-rejection apparatus of step 6 and then is discharged as waste. The concentrated brine stream 128 is blended in the well-stirred section of a clarifier-thickener with a stream 129 containing aqueous alkaline sodium carbonate (130) which is produced in step 14 described hereinbelow. The amount of sodium carbonate added is in excess of equivalence of the calcium content of the incoming brine, and sufficient caustic soda is added from 131 so that pH 9 minimum is achieved in the clarified brine product 132 drawn from the clarifier-thickener, which has a residence time of 2.5 hours (range 2 to 4 hours approximately) in the clarifier. The thickened slurry from this calcium depletion steps consists primarily of calcium carbonate and it passes out via 133 to be used in part as stream 135 which neutralizes product water, and the balance 134 joins brine in 136 which is discharged as waste. The clarified stream 132 is acidulated with aqueous hydrochloric acid from steam 123 and admixed with stream 143 which is the recirculated mother liquor drained from salt cristals produced in step 9 described hereinbelow. The caustic soda and hydrochloric acid mentioned hereinabove derive at least in part from the operation of step 11 (electrolysis) and step 12 (hydrochloric acid production).

The acidulated brine stream 137 passes to the cristallizer step 8 which separates cristals of sodium chloride, or sodium chloride hydrate or eutectic or both, in consequence of the removal of a less saline stream 138.

Without change of principle the calcium depletion step 7 can take place upstream of the separation step 6; in this event, stream 125 would be carbonated as described above, and after removal of the precipitate the clear brine is acidulated with stream 123, befor passing to the separation step; concentrated brine from the separation step is admixed with recycle 143 and passes to the cristallizer. The cristallizer may be of the evaporator type, yielding sodium chloride slurry in brine 139 and a condensate stream 138, which is followed as step 9 by the draining of brine from sodium chloride cristals and the washing of said cristals free of mother liquor using a small permeate stream 140. A simple filter or centrifuge device may be employed in step 9 which results in three products as follows:

(i) sodium chloride 141 which is mixed with recirculating electrolyte 147, and passes as stream 148 to the recycle brine purifier step 10;
(ii) mother liquor stream 142 which is in part recirculated as stream 143 to the cristallizing evaporator, and in part discharged as stream 144 to waste because of the magnesium sulphate and other impurities contained therein; and
(iii) washings stream 145 which is recirculated to the separation step 6.

Alternatively, the cristallizer may be a eutectic cristallizer, similar to that described in "Design and Specification Bid Package, 10,000 GPD Eutectic Freeze Pilot Plant," Office of Water Research and Technology/S 78, No. 18, U.S. Department of Interior, Order Number PB 250455, which however combines the functions of step 8 and step 9 since with it there can arise three product streams which are:

(i) the ice melt, becoming the less saline stream 138;
(ii) the eutectic melt, becoming the stream 141 but however containing 23 percent by weight approximately of sodium chloride in water; and
(iii) the mother liquor stream 142 in part discharged to waste as 144 and in part recirculated as 143.

Additionally, a washing stream 145 if produced is recirculated to the separation step 6.

The calcium depletion treatment step 7 is not essential as a pretreatment for the feed of a eutectic cristallizer because metal heat-exchange surfaces are not used in contact with the mother liquor in such equipment, but if employed it usefully avoids precipitation of calcium salts in the mother liquor. Clearly, evaporative and eutectic cristallizers may as an option be used advantageously in combination wherein eutectic melt, salt cristals, and recycle brine (147) are fed to the recycle brine purifier.

A distillate stream (146), added to compensate for electrolyte losses described hereinbelow, and a stream 147 which is a water-cooled portion of the electrolysis brine 157 discharged from step 11 because the sodium chloride concentation therein (about 15 percent by weight) is too low to be efficiently electrolized dissolve the solid sodium chloride product of step 9 and the combined stream 148 passes to a recycle brine purification step 10. In a well-stirred blending device, such as a centrifugal pump or a tube provided with rotating propellers at its axis, stream 148 is mixed with aqueous caustic soda 149 in sufficient quantity to achieve a pH of 10.8 minimum, a stream 150 of seed material sampled from the collected precipitate of the clarifier of step 10, and sufficient alkaline sodium carbonate (151) to be equivalent, at least, to any calcium content in the stream 148. The combined stream (152) passes to the clarifier of step 10 at a temperature of about 50° C. (range 40° to 60° C.), wherein a mean residence time of approximately three hours (range 2 to 4 hours) provides for the settling and removal of hydroxides and carbonates of multivalent cations such as magnesium, transition-metal ions such as iron and manganese, and calcium; these are present in the salt stream 141 in trace amounts, but because of the recirculation of electrolyte would accumulate therein and quickly exceed their concentration limit of one ppm or less, considered safe when electrolising salt. The slurry underflow 153 from the clarifier preferably passes through a device which samples from it a slurry containing solids of a size range (5 micron diameter approximately) suited for use as seed cristals stream (150) as described hereinabove. An example of such devices is the hydrocyclone which classifies the suspended solids using centrifugal action. After sample removal, the slurry stream 155 joins the brine stream 136 which is discharged as waste via 107.

A clear electrolyte stream 156, which is saturated or nearly so with sodium chloride, is the overflow product of the clarifier of step 10, which is pumped through a sand-bed filter (to remove accidental overflow of solids) and passes to the electrolizer step 11. Several available varieties of process are suited to the electrolysis of salt in step 11. Two brief descriptions follow, each devoted to an important distinct variety, showing the way each is adapted for use with this invention.

The Castner-Kellner variety is characterized by the use of mercury cathodes which dissolve sodium resulting from the discharge of sodium cations at the cathode surface when brine electrolyte 156 passes through the gap between a mercury cathode and a series of anodes, which are of carbon or of platinized titanium, in a closed container. Chlorine gas is released at each anode and passes from the container. Brine from which salt has been partly removed passes from the chamber as stream 157, which is depleted of chlorine by methods which are well-known (such as using air or solvents) (not shown), and a small portion (178) is discharged as waste sufficient at least to discharge accumulations of sulphate anion at steady-state concentration levels (about 1 percent of the chlorine content) which are not injurious to the electrolysis of chloride ion. The remainder (147) is cooled by heat exchange (for example, with brine stream 116) and passes to step 10 as described above. Meanwhile, the mercury amalgam from the first container recycles through another container in which the amalgam is decomposed, that is "stripped" or "denuded" of sodium by contact with distillate water 103 in a finely-divided stream. The caustic soda which results from this (102), displaced from the stripper by the incoming stream 103, contains about 50 percent dissolved sodium hydroxide and less than one percent sodium chloride approximately; it may be diluted with a saline stream such as permeate 179 if desired for use in the process, for example as the stream 101. Hydrogen gas is formed (180) when amalgam is decomposed with water; in part (216) this is consumed in step 12 described hereinbelow, and the remainder (217) is burned with air in a waste heat boiler or catalytic inert-gas generator, generating low pressure (30 (psig) steam used as one heat source for multi-effect evaporation of brine described hereinabove.

The diaphragm variety of process is characterized by the use of membranes, between each anode and adjacent cathode, which transmit some dissolved ions readily but obstruct both the passage of water from cathode cell to anode cell (formed using membrane as described below) and the rate at which sodium hydroxide returns by diffusion to the feed brine as it passes through the electrolizer. This membrane action occurs when the anodes and cathodes, arranged sequentially as electrode pairs, are suitably enclosed using diaphragm material and in other ways so as to form a series of adjacent chambers. Chambers of a common type (as for example anode chambers) are connected, by pipe or suchlike, so that a stream of concentrated sodium chloride brine 156 passes sequentially or in parallel flow through each chamber formed by diaphragms enclosing anodes, whereas the distillate stream 103 passes similarly through chambers enclosing cathodes. The concentrated sodium chloride brine becomes depleted of salt as a result of electrolysis; chlorine gas is released from each anode chamber and the movement (due to the applied voltage) of sodium cations through the membranes to each adjacent cathode chamber where sodium hydroxide is formed when hydrogen cations are discharged and hydrogen gas is released from each cathode chamber. The distillate stream 103 displaces the sodium hydroxide from the cathode chambers; this contains sodium chloride and may be used in the process without further purification; however, a commercial grade of caustic soda may be produced from it by a process involving concentration and cristallization from it of excess sodium chloride (not shown). It will be understood that not attempt has been made to describe other ionic migrations by which electrical current passes through salt brine, which are incidental to the invention disclosed herein.

The recycling of brine from the diaphragm process follows the outline disclosed hereinabove in connection with the Castner-Kellner variety of process.

There is no requirement that step 11 should consist exclusively of one variety of electolysis process, but it is customary that this would be so. The hydrogen produced by electrolysis is cooled to remove water, and used for two purposes as follows. Step 11 requires supply of a stream 216 of hydrogen which is an amount just in excess of the process requirement for hydrogen chloride.

A waste heat boiler which produces low pressure (30 psig approximately) steam (not illustrated, but alluded to above in connection with step 6) consumes the remainder of the hydrogen by burning it in air; auxiliary carbonaceous fuel may be fired to this waste-heat boiler if necessitated by the demand for steam and/or cabon dioxide.

A very small amount only (stream 154) of the chlorine product of electrolysis 181 is recycled to the first treatment, described hereinabove.

Adjunct processing, by which reagents used in the process hereinabove described are prepared, consumes a major portion of the chlorine product of electrolysis. Such adjunct processing is described below:

In Step 12 a chlorine stream 182 is burned in an atmosphere of hydrogen (or hydrogen and chlorine are passed together over a catalyst); the heat generated in the process may be removed primarily in a waste-heat boiler, and the hydrogen chloride (183) is preferably dissolved in brine or water streams which recirculate from the points-of-use of hydrogen chloride as outlined hereinabove. The small hydrogen surplus in the absorber waste gas is disposed of suitably, for example in a waste heat boiler. The remainder of the chlorine (184) is predominantly a commercial surplus (186), which may be dried and liquified, or converted to chlorine chemicals.

In step 13 a part (225) of the slurry underflow product of step 1 is first drained of free water, such as by filtration or centrifugation. Then the solids, which are predominantly calcium carbonate, are dissolved, at least in part, using the stream 187 of hydrochloric acid and the stream 185 of chlorine, in combination with permeate (118). This releases carbon dioxide gas 227 and produces the reagent 177 which is an aqueous solution containing the chloride and the hypochlorite of calcium. Waste solids, and the filtrate from stream 108, are 214, which is disposed of in stream 107. The appended example contains a more detailed description of step 13.

Carbon dioxide gas (227) from step 13 at least is absorbed in step 14 by stream 188 of aqueous sodium hydroxide. Supplementary carbon dioxide gas (not shown, obtained for example from burning carbonaceous fuel in a waste heat boiler) optionally might also be absorbed in step 14. The result is a reagent which is aqueous sodium carbonate to which is added stream 131 of sodium hydroxide sufficient to result in pH 9.5 in the clarifier of step 7 (of FIG. 1(a)).

In the product blending step 20, chemical additions are made to the product water of the process. The stream 177 containing dissolved calcium chloride and calcium hypochlorite protects the water and the distribution piping system and storages, by providing sterilizing action and reducing the rate at which calcium leaches from concrete linings. The pH is increased to within the range for potable water (pH 7 to 7.5 approximately) by suitable means which are well known (adding lime or limestone). In the preferred means, which is illustrated, calcium carbonate produced in step 7 is added (135) in at least sufficient quantity to neutralize the acidity of the permeate and provide that the pH in the product water is in the correct range for potable water (7 to 7.5).

Methods for purifying brine which may be used in conjunction with this process are not limited to those in which solid sodium chloride is separated from solution, but include those in which chemical reagents are used to remove from brine the unwanted anions and cations, by forming insoluble salts which precipitate from solution and are removed. To aid understanding of this there has been included herewith a FIG. 1(b) in which steps 1 through 5 are unaltered from the description given them hereinabove, and departures from 1(a) commence at the separation step 16 which removes water stream 189 from brine by a staged process (such as evaporation or the cristallization of ice), for which the brine feed is taken not only as stream 125 from step 5 as described hereinabove, but also as stream 190 which is brine recycled from electrolysis step 11 for the reasons outlined hereinabove, is stripped of chlorine, deaerated, and cooled appropriately (which are procedures mentioned hereinabove, but not shown in FIG. 1(a) or 1(b) to preserve clarity).

Brine stream 191, which is removed from the separation step, has a concentration just lower than that at which solids precipitate, and contains sodium chloride of more than 25 percent concentration, approximately. This is blended with reagent stream 192, either in a well-stirred section of the clarifier of step 17, or in an in-line blender upstream of the clarifier, and with seed cristals, drawn from the settled product of the clarifier of step 17 by methods described hereinabove in connection with step 10. The reagent stream 192 is an acidic aqueous solution containing predominantly calcium chloride of about 20 percent by weight concentration, and hydrochloric acid sufficient to maintain a pH of 5 (range 4 to 6.5) approximately in the clarifier of step 17. Because of the formation of a precipitate of calcium sulphate, in the presence of a sufficient excess of calcium cations; the sulphate ion concentration in brine is reduced in this way to a level compatible with efficient electrolysis is step 11; the specified maximum sulphate concentration depends on the design of electrolizer but is less than one percent of the dissolved solids in the brine. A slurry containing about 15 percent (range 10 to 30 percent) approximately of calcium sulphate in brine (stream 193) is drawn from the bottom of the clarifier, sampled for seed cristals as outlined hereinabove, and discharged to waste in stream 210. Without alteration of principle the sulphate depletion step 17 may include a second stage in which a reagent containing soluble barium cation (such as one prepared by dissolving the mineral "witherite" in hydrochloric acid) is added in an amount representing a slight deficit compared to the remaining dissolved sulphate anion, and removing the precipitate of barium sulphate which is formed. Residual sulphate concentrations as low as 15 ppm may be obtained in this way. The clarified supernatant product of step 17 (stream 194) may optionally be neutralized by contact with calcium carbonate from a suitable source and then passes to step 18 in which it is blended with sufficient aqueous caustic soda (stream 195) to precipitate magnesium cation as insoluble hydroxide (solution pH in excess of 10.8 approximately). The clarifier of step 18 provides sufficient residence time (about 3 hours) to form a settled product slurry stream 196 containing about 15 percent (range 10 to 25 percent) by weight of solids, which is discharged to waste in stream 210, or may be drained and used as a source of magnesium chemicals. The clarified supernatant product of step 18, stream 197, passes to step 19 in which it is "recarbonated" in a clarifier by the addition of carbon dioxide stream 198 which is a byproduct of the preparation of reagent streams 177 in step 13 and 192 in step 15 described hereinbelow; this depletes the brine of calcium cations by the formation of calcium carbonate, and reduces the brine pH to 9.5 approximately. The settled product of step 19 is a slurry containing about 15 percent (range 8 to 20 percent) approximately by weight of calcium carbonate in brine; this is drained on a filter, the liquid passing to waste via 175; the calcium carbonate solids optionally enter the product water as stream 201 by being dissolved from the filter by passage therethrough of permeate (which is acidic) from step 4, or step 5, or both. Any unused solids are backwashed periodically to the waste stream 175.

The clarifiers of steps 17, 18 and 19 are of steel, rubber-lined in the case of that for step 17 to protect steel parts in contact with acidic brine; the clarifier for steps 18 and 19 may be combined together in the one apparatus as a clarifier of the "balanced tray" design or otherwise, and these two process steps 18 and 19 may be combined in the one clarifier if it is not desired to recover the calcium-bearing precipitate separately. The clear supernatant product from step 19 is pumped through a sandbed filter or suchlike, which removes any accidental overflow of solids, and then passes to the electrolizer step 11 as stream 200, which is an aqueous stream containing preferably 38 percent (range 25 to 39 percent) approximately by weight of sodium chloride, and is suited to electrolysis of sodium chloride in step 11, described hereinabove.

Reference to table 1 discloses that brine stream 200 conveys a greater daily flow of sodium chloride to the electrolizer step 11 in FIG. 1(b) than does its counterpart 156 in FIG. 1(a) because there is no equivalent loss in 1(b) to the discharge to waste of stream 144 in 1(a), which contains chlorides and sulphates, predominantly of sodium and magnesium. Moreover, the sodium chloride flow from 125 is supplemented by the flow of sodium- and chloride-bearing chemicals used to treat the brine, which are much the larger in the case of the method illustrated by 1(b), and it therefore follows that the conversion of salt in the electrolizer also must be the larger in the method illustrated by 1(b). The wastage of salt, via stream 203 shown in Table 1, from weak electrolysis brine is in excess of that required to discharge accumulated impurities from recirculating brine. This being so preserves for the flow of both methods a zero commercial surplus of sodium hydroxide. It is preferable, instead, to increase the flow of recycle brine 124, thereby reducing the flow of salt via 125, thus reducing the flow of waste salt via stream 203 to the value found to discharge accumulated impurities without unnecessary salt wastage. As has been mentioned hereinabove, after recycle brine has been stripped of chlorine, deaerated, and cooled appropriately it rejoins the separation step 16, at a stage which concentrated brine containing approximately twenty percent sodium chloride, to contribute to the flow of nearly saturated brine via 191.

Step 11 requires supply of a stream 204 of hydrogen which is of an amount just in excess of the increased process requirement of hydrogen chloride, and the balance of hydrogen production (205) is burned in a waste heat boiler.

In step 12 a chlorine stream 207 is burned in an atmosphere of hydrogen and hydrogen chloride stream 208 passes to absorbers which acidulate various process streams as described hereinabove. After allowance for the very small amount (154) of the chlorine product of electrolysis (206) which is recycled to the first treatment at step 2, and the chlorine stream 185 which is absorbed in step 13, the remainder of the chlorine is a commercial surplus 208, which is somewhat larger than the stream 186 of FIG. 1(a). This reflects the predominant influence of the larger sodium chloride conversion in electrolysis.

Step 13 is unchanged from that described hereinabove, and below in Example 1.

Step 15 produces an aqueous reagent containing calcium chloride which is stream 192 described hereinabove. The equipment of step 15 is identical to that described herein for step 13, and its operation differs only in that chlorine gas is not added with hydrochloric acid gas 221 and brine 222 is added which dissolves the calcium carbonate solids filtered from the slurry 226 of step 1. The aqueous waste 209 from the slurry filtration passes to the waste stream 210. The stream of carbon dioxide laden gas which is evacuated from the filters (see the Example 1) of both step 13 and step 15 provides the stream 198 of carbon dioxide used for recarbonation in step 19. Surplus carbon dioxide may be absorbed in step 14, as shown, and added to the stream 101 to enhance calcium removal in step 1, or else carbon dioxide is discharged as waste.

Step 20 combines the various components of the product water of the process illustrated in FIG. 1(b). These are:
(i) the balance of the distillate production (224) after allowing for 223 used in the electrolysis step 11;
(ii) the calcium carbonate stream 201 which dissolves in permeate and provides for a neutral product water;
(iii) permeate stream 221 from step 4 and 122 from step 5; and
(iv) sterilizing reagent stream 177 produced in step 13.

It will be clear that the novelty of the third treatment, as a result of which brine stream 121 yields sodium hydroxide, chlorine, and hydrogen may also be applied without the step 1 (as hereinabove described) as prerequisite; the first treatment under such circumstances is unaltered from reverse osmosis according to prior art wherein step 1 is replaced by a preliminary filtration which removes coarse suspended solids. Compared to the description herein contained the amount of acid addition in step 2 and after step 3 in these circumstances is adjusted to allow for the presence of bicarbonate anions in clarified feedwater. Step 4 permeation processing may be adjusted to allow for heightened concentration of calcium cations, and bicarbonate remaining in stream 125 is removed by aeration in the acid conditions followed by deaeration under reduced pressure of about 1 psia. Steps 13 and 15 need to be supplied with calcium carbonate from an external source, and most sodium hydroxide product of the process is a commercial surplus.

EXAMPLE 1

The process is exemplified with reference to a saline water source which is seawater containing 44,000 parts per million by weight of total dissolved solids (ppm T.D.S.) approximately. Furthermore, the process example employs reverse osmosis (RO) separation of potable water and brine from the referenced seawater because the first step of the process reduces the calcium content of the feedwater while at the same time sterilizing and clarifying it, and these features are especially valuable when used in conjunction with RO.

An understanding of the process applied in this working example is assisted by reference to the process flow diagram 1(a), and to Table 1, disclosing in detail the flow rate of dissolved solids referenced in each case to flows marked on the diagram. The flow commences with the above-mentioned saline water stream (100) which is treated in step 1 first by blending with a stream of aqueous caustic soda (101) sufficient in amount to be equivalent approximately to the sum of bicarbonate, silicate, and phosphate anions entering as part of the saline source (100). Such anions are converted in these circumstances to a preponderance of a more basic form (for example, bicarbonate is converted to carbonate) which readily forms insoluble salts by combining chemically with alkaline earth cations (predominantly calcium, also strontium and barium) which are part of the dissolved solids of the saline water stream (100); the pH of the seawater simultaneously increases from about 7.8 to about 10.9 (range of the pH of the filtrate from step 1 of the process is 9.5 to 11, approximately). The thick slurry of alkaline-earth salts which precipitates, along with microscopic debris and materials from the seawater which adsorb on and are absorbed by the precipitate, is allowed to settle, so as to achieve some reduction of water content of the withdrawn slurry. The Step 1 is conveniently accomplished using a conventional clarifier/thickener of mild steel construction, of a size sufficiently large to result in a substantially clear, sterile supernatant liquid (108) passing to step 2; a mean liquid residence time of about 2 hours (range 1.5 to 3.5 hours) and a pH of about 10.9 is appropriate.

The slurry stream (105), which is the settled (underflow) product of the clarifier/thickener, contains about ten parts of solids by weight per 100 parts of brine (range 5% to 15%, approximately). A portion of this slurry (stream 225) passes to Step 13 (discussed hereinbelow in more detail), but the major portion (stream 106) of the underflow slurry is discharged to waste. The caustic soda consumed in Step 1 is manufactured from salt in Step 11 (as a result of the use of techniques of brine treatment in Steps 6, 7, 8, and 9, also outlined in more detail hereinbelow).

The effect of Step 1 processing may be seen by comparing stream 108 (the outflow) with stream 100 (the inflow) in the table of dissolved solid flows; in particular the calcium content of the outflow is reduced and as a consequence the magnesium/calcium weight ratio in dissolved solids is augmented by 33 percent. Provision has been made in the diagram (stream 104) to add surplus carbonate-containing reagent from Step 14 (discussed below in more detail) to the caustic soda stream (101). The effect of recycling carbonate to the feedwater is to make more complete the removal of calcium from the feedwater passing from Step 1, augmenting still further the magnesium/calcium weight ratio in the dissolved solids therein, possibly permitting higher recovery of permeate from feedwater in Step 4 below. There is zero flow in stream 104 for this working example.

As an option, caustic soda (stream 101) and seawater may be blended upstream of the clarifier/thickener (e.g., at the suction of the main seawater pump(s)); this effectively utilizes the residence time of the seawater intake pipeline, and enables it to be constructed of mild steel which otherwise cannot be used because corrosion debris therefrom contaminates the feedwater.

An in-line blending device or its equivalent is used to blend a stream of hydrochloric acid (109) with the clarified feedwater stream (108), decreasing the feedwater pH to the level required for downstream processing (pH 5.0 to 6.5 approximately, depending on R.O. membranes used in Steps 4 and 5). Sufficient chlorine is present in the stream 109 as it enters Step 2 to maintain sterility conditions while feedwater passes through the filters of Step 3; this is identified in the diagram by the stream 154, but trace quantities of chlorine only are involved. In the preferred arrangement shown, small quantities (111) (2 ppm approx.) of a polyelectrolyte chemical known to be effective in promoting coagulation of finely-divided insoluble solids are also blended in Step 2; in this event stream 113 is divided into two parts so that a pH value of approximately 7.5 is maintained in feedwater through Step 3 (to assist the action of the coagulant aid) and the balance of stream 113 is added at the suction of the reverse osmosis pumps of Step 4 discussed hereinbelow. Ferric chloride may be used in place of the polyelectrolyte chemical of this option, if the pH for the coagulation stage has the appropriate value (8, approximately) to form ferric hydroxide.

Treated feedwater (stream 110) from Step 2 passes to the filtering procedures represented in the diagram as Step 3. This step uses apparatus known as multimedia filters; the active element in a component device of such an apparatus consists of a mixture of finely divided but uniform (size range 0.6 to 1 mm diameter) insoluble particles of anthracite (specific gravity (S.G.)=1.6, approximately) and of sand (S.G.=2.6; size range 0.2 to 0.4 mm diameter). A metal grid or screen is so constructed (in the top or bottom of a containing vessel, whichever is "downstream" during filtration) as to retain the sand particles but not to impede the flow of water therethrough. Before filtration commences, such a mixture of fine particles is first subjected to a flow of brine (stream 211) from Step 4 outlined hereinbelow, directed from the grid then through the particles. Under the influence of this flow, the coarser, lighter anthracite particles form into a porous bed approximately 50 cm thick downstream of a similar bed of the finer, denser sand particles, which form a porous bed approximately 25 cm thick. The component filter device contains one such active element as has been described above within a suitable box or cylindrical vessel. Feedwater stream (110) is admitted in parallel streams to each such device of the filtering apparatus of Step 3 at a superficial velocity (i.e., velocity through the space just above the porous bed) of 0.1 meter per minute to 1.0 meter/min., approximately, in a direction passing through the bed and then through the supporting screen. A sufficient number of filters is used in the apparatus to provide the required aggregate feedwater flow for the process, having in mind the expected time required for repair, rejuvenation or suchlike procedures, discussed below. In order for the filtrate from a given filter device to be passed to Step 4 it must be substantially free of the brine material (212), and to be adequately clear (that is, to have a measured slit density index of less than 3). If it meets these specifications, it passes through a cartridge filter (the active element of which is porous paper which retains particles larger than 10 microns in diameter), the purpose of which is to protect downstream pumps from damage if there should be an accidental flow of solids such as filtration sand. If the flow from a multimedia filter device is the brine used in rejuvenation (discussed hereinbelow), it is sent to waste; if it is filtered feedwater which however does not meet clarify specifications, it is returned to Step 2 (line not shown).

The filtering action of the bed of granular solids is judged to be exhausted when the filtrate is too turbulent (suggesting that channels of unimpeded liquid flow have formed in the granular solids) or the filtrate flow rate is too low (suggesting that the granular bed is partially blocked by debris or coagulated material). This exhaustion of the filtering action occurs periodically with each such filter device, and requires that the flow of feed and filtrate therethrough should be closed (downstream steps of the process then are supplied with their feedwater requirements from similar filtering devices held ready for this eventuality).

The process of rejuvenation of an exhausted multimedia device of this apparatus commences by directing a stream of compressed air from below the support grid, through the granular solids, then out the end of the containment vessel; this breaks apart agglomerates of adhering granular solids and of the accumulated debris or coagulated material from the feedwater. Then a gentle flow (i.e. below the settling velocity of the anthracite particles but above the settling velocity of the debris and coagulated solids) of the brine stream 211 (from Step 4, discussed hereinbelow) is pumped through the supporting screen, then through the granular solids, and out the end of the containment vessel. This removes by a process of elution only the debris and coagulated solids, leaving the granulated solids (anthracite and sand) arranged with a porous layer of sand between the support grid and a porous layer of anthracite, in which condition it can provide efficient filtering action for feedwater which is to flow through the anthracite particles (where coarse solids deposit) then through the sand (where fine solids deposit). The brine and debris which pass from the filter during the rejuvenation process are sent to waste (212).

After completing the rejuvenation, feedwater is pumped in the direction indicated above, displaced brine is sent to waste, insufficiently clear filtrate is returned to Step 2, and thereafter clarified filtrate passes through cartridge filters, is mixed with a recycled brine stream (124) from Step 5 outlined hereinbelow, with aqueous acid (112) and with aqueous solution (114) of certain chemicals. The aqueous chemical solutions flow from storage tanks through the metering pumps and are added directly to the feedwater contents of a "clearwell," which is a container or pot, suitably constructed and lined to prevent contamination of the feedwater, and which is connected by pipeline ultimately to the suction of the high pressure feedwater pumps of Stage 4. These chemicals are of two types, as follows:

(a) a "sequestrant" (typically sodium hexametaphosphate (SHMP) which is added in the amount of 8 ppm T.D.S. approximately to feedwater), the action of which is to reduce the availability of calcium cation so that insoluble calcium salts are less likely to separate in Step 4 as a result of extracting, from the feedwater, the less saline permeate.

(b) a "dechlorinator" (typically sodium metabisulphite, which is added in excess of the amount required to remove chlorine and hypochlorite anion from the feedwater passing to the brine chamber of Step 4). This is added only if the permeators of Steps 4 and 5 are constructed using material which degrades in the presence of free chlorine or hypochlorites; the dosage level of dechlorinator chemical is determined from the measured content of chlorine and hypochlorite in the feedwater passing through the "clearwell."

Optionally, heat exchange may be applied to the feedwater upstream of the pumps of the R.O. Step 4, to the extent justified by any economic process improvement which results; the preferred feedwater temperature is in the range 15° C. to 20° C. approximately when seawater is processed by the methods outlined herein.

After its passage through the high pressure R.O. pump, the feedwater flows at a pressure of approximately 1000 psi (range 900 to 1200 psi) into the brine chamber of the permeator devices of the apparatus of Step 4. Permeators of any type are suitable, for example those in which the active element is a thin membrane wound in a spiral, or those in which the membrane takes the form of a hollow fiber. Preferably all brine flows pass sequentially through two brine chambers having substantially the same pressure but different saline concentrations; typical maxima for 16° C. brine are 75,000 ppm approx. in the first pass, and 93,000 ppm approx. after the second pass. A sufficient number of such two-pass brine flows are connected in parallel so that the permeate product of Step 4 has a flow and salinity such that salt passage to downstream processing is at least the sum of that consumed in the electrolysis (Step 11), plus that passed out in the products of the process, plus that recycled to Step 1 via the caustic soda stream 101. By reference to the table it may be seen that these conditions are met when Step 4 permeate has a salinity of approximately 1100 ppm (range 400 to 1200 ppm T.D.S.).

Brine flow (116) passes from Stage 4 permeators through a depressuring apparatus (either a pressure-reducing valve or a turbine) in sufficient quantity so as to ensure that scale-forming materials do not precipitate on membrane surfaces within the permeators. All brine from Stage 4 passes ultimately to waste, after passing through condenser tubes of heat rejection stages of separation (Step 6), also the exchangers of other heat-rejection equipment of the process, and feedwater filters (Step 3) as described hereinabove as needed (211) to flush debris and restore efficient filtering action.

The permeate product from Step 4 is used to satisfy three requirements as follows:
(a) product water component (221) which undergoes no further processing but is blended with other components outlined hereinbelow.
(b) washwater 140 which is a small stream used in purifying salt in step 9, as outlined hereinbelow.
(c) feedwater for Step 5 (120).

Stream 120 in this example has a salinity of approximately 1100 ppm T.D.S. and a pH of 5.0 approximately. It passes from Step 4 into a clearwell, which is connected to the suction of the high pressure feedwater pump of Step 5, to which it passes without addition of chemicals. Step 5 utilizes permeators which are similar to those described hereinabove for Step 4 but the brine makes only one pass across the membrane system, which is the conventional brine path for permeators. In this example the brine pressure as the brine passes into the depressurizer is 550 psi approximately, and both brine and permeate produced by Step 5 have lower saline concentrations than the corresponding values of Step 4, as indicated in the table. The brine product of Step 5 is used to satisfy two requirements as follows:

(a) recycle (stream 124) which passes into the clearwell connected to the suction of the high pressure pump of Step 4, as outlined hereinabove.
(b) brine (stream 125) which passes directly to Step 6.

The saline concentration of brine produced in Step 5 is adjusted to have a value suited on the one hand to the need or requirement of the products of electrolysis in Step 11, and on the other hand to the capacity of the brine separation to concentrate the brine to the levels required for electrolysis. This adjustment is made by appropriate choice of the number of permeators on line in Step 5 and the brine pressure (achieved by adjusting the depressurizing equipment of Step 5) with simultaneous adjustments in both the recycle flow (124) and the product water flow (117) of step 4.

Special reference should now be made to FIG. 1(a) wherein stream 125, and a saline stream 145 which has been recycled as discussed hereinabove from Step 9, pass to a separation Step 6 the purpose of which is to economically remove water from brine without causing precipitation of dissolved materials. In this example, Step 6 is a 12-effect vacuum distillation apparatus having a maximum brine temperature of 270° F. approximately, producing a distillate stream 127 and a brine stream 128 which is nearly saturated with salt and with calcium sulphate, and rejecting heat at the low temperature stage by condensing steam on tubes cooled by the waste brine flow (116) from Step 4. Apparatus which is suitable, or nearly so, is produced by Sasakura Engineering Co. Ltd., of Japan, and by others. The brine heaters require 2000 tons/day of steam approximately having a pressure suited to the condensing temperatures involved. This is produced in part in a waste heat boiler which in addition to burning supplementary fuel burns two tons per day approximately of hydrogen (from the electrolysis Step 11, surplus to consumption in Step 12), in part from sundry waste heat sources such as electrical flows and feedwater cooling.

The brine stream 128 and a chemical stream 129 are mixed in an inline blender, or pump impeller, or well-stirred section of the clarifier of Step 7, and the precipitate of basic calcium carbonate is allowed to settle during a residence time of approximately 2.5 hours. The chemical stream 129 comprises the aqueous alkaline sodium carbonate stream 130, containing carbonate anion equivalent to calcium cation in stream 126 and produced in Step 14 as described hereinbelow, plus the aqueous caustic soda stream 131 added if necessary to adjust the pH in the clarifier of Step 7 to a value of approx. 9.5 (range 8.5 to 10). The settled slurry product (133) is used in part (135) to neutralize product water in a way which increases its calcium content and thereby renders the water compatible with concrete-lined steel pipelines, etc. Any suitable neutralizing method may be used; preferably the slurry is drained of brine on a filter bed and then dissolved from the filter bed by passage therethrough of acid permeate from Step 5. The brine which has been drained from the filter bed, plus sediment removed by backwash of the filter using the said brine constitutes the stream 134 of waste flowing via 136 to 107. The clear supernatant brine from Step 7 is the stream 132; this is acidulated slightly to pH 6.8 by admixture with stream 218 which comprises aqueous hydrochloric acid—123—and recycle brine 143, which has been drained from salt cristals in Step 9 described hereinbelow.

The acidulated brine 137 passes to the salt cristallizer Step 8, which separates it into a distillate stream 138 and a slurry 139 of cristals of sodium chloride in saturated salt brine, by applying heat (using 30 psig steam from the waste heat boiler) to the brine held under vacuum, and condensing the distillate using the cold waste brine stream 116 flowing through the condenser tubes.

The slurry 139 is pumped to the centrifuge or filter employed in Step 9 to separate salt cristals 141 from the saturated brine 142. Preferably, the apparatus of Step 9 is a rotary vacuum precoat filter, such as is supplied by the Dorr-Oliver Corporation of U.S., or equivalent apparatus supplied by others, on which the salt cristals may be washed free of adhering surface impurities (predominantly magnesium sulphate) by being sprayed with the permeate stream 140; the washings which drain from this (145) are recycled to Step 6 as the stream 145. The saturated brine 142, drained from the salt cristals, is in large part recycled as the stream 143, except for a stream 144, which contains magnesium cations and sulphate anions which are approximately equivalent to the content of the same ions in the stream 125 entering Step 6, which is discharged to waste. The salt cristals are removed in any suitable way from the filter bed or centrifuge of Step 9, formed into a slurry by the addition of a distillate stream 146, and pumped to the blender upstream of the recycle brine purifier (Step 10) which has been described hereinabove.

The slurry underflow from the clarifier of Step 10, after removal of the sample stream 150 of seed cristals which are recycled, is the slurry 155 containing magnesium hydroxide, possibly including iron oxide corrosion products such as could arise from the operation of the electrolysis apparatus in Step 11. The sodium chloride stream 141 is produced in sufficient amount as to be equivalent to salt removed, by electrolysis in Step 11, and through the electrolyte purge flow 178. The water addition 146 replaces net water losses in electrolysis, chiefly as stream 155, 178, and that removed as vapor in the hydrogen and chlorine gas streams.

The stream 156 is saturated with sodium chloride, or nearly so, and is filtered free of solids which by accident or otherwise might overflow from Step 10, before passing to the electrolysis Step 11. The electrolyte purge flow 178 is sufficiently large to discharge unwanted accumulations, for example of sulphate at concentrations such that they do not interfere with electrolysis of sodium chloride.

Electrolysis cells of many commercially available designs are suited to Step 11. The Mathieson mercury cell of the Olin-Mathieson Chemical Corporation, Alabama (U.S. Pat. Nos. 2,328,665; 2,334,354; 2,423,351 and others) and the Solvay mercury cells of Electrochemical Processes, Inc., U.S. (U.S. Pat. Nos. 2,550,231; 2,551,248; 2,617,762; and others) are examples of the Castner-Kellner process. This working example uses Mathieson mercury cells, in the electrolysis chamber of which very strong brine passes rapidly through the gaps between a mercury cathode and a series of anodes, as outlined hereinabove, and as electrolysis proceeds each anode issues chlorine gas resulting from the discharge of chlorine anions at its surface, whereas the mercury cathodes dissolve sodium resulting from the discharge of sodium cations at the cathode surface. Chlorine gas is pumped from the electrolysis chamber, and may be dried by contact with an appropriate dessicant (for example alumina or silica gel regenerated by contact with a stream of hot air) prior to liquefaction or else used directly in the production of hydrogen chloride and calcium hypochlorite. Mercury amalgam is also pumped from the electrolysis chamber and recirculated after passage through a stripper vessel discussed hereinabove, which is flushed continuously with a distillate water stream 103. Hydrogen gas issues from the stripper vessel which passes through a tubed heat exchanger cooled with brine stream 116 (to remove water) and thence to Step 12 as stream 216, or else (217) to waste heat boilers. The concentration of aqueous caustic soda in the stripper vessel reaches about 45 percent by weight TDS, or some convenient lower concentration, before it is pumped away to storage tanks, from which it is used for the chemical streams 131, 149, and 188, or diluted with the saline stream 179, and passes to Step 1 as stream 101.

The hydrogen issuing from the stripper vessels of the electrolysis Step 11 amounts in this example to 5 tons daily, of which approximately one-half (216) passes to Step 12 in which it is converted to hydrogen chloride gas (183). The remainder of the hydrogen (217) is burned in air in a waste heat boiler which produces low pressure (30 psig) steam used in the brine heaters of the Step 9 distillation process.

The chlorine stream (181) issuing from Step 11 in this example amounts to 176 tons daily; part of this is consumed in meeting process requirements as follows:
(a) production in Step 12 of hydrogen chloride used in the process from chlorine stream 182;
(b) ensuring sterility in the filter devices of Step 3 from chlorine stream 174;
(c) preparing in Step 13 an aqueous reagent of hypochlorite chemicals from a chlorine stream (185) and the carbonate solids from stream (108); this reagent (177) is added to product water of the process.

In this example there is a residual stream of chlorine ((186), released from electrolysis but surplus to process use; commercial products to which this may be converted by manufacturing methods which are well known include hypochlorite chemicals, also liquid chlorine.

In Step 12, hydrogen and chlorine combine chemically either by passage through a catalyst, or uncatalized combination in a flame in which chlorine burns in hydrogen gas. Hydrogen chlorine gas containing a slight excess of hydrogen and a trace of chlorine is the result; the process is well known and will not be described here, the apparatus is simple. Preferably each process requirement 113, 187 and 123 of this example is produced in separate converters, and HCl is transferred in solution in an aqueous brine stream which recirculates between the consuming process step and a simple absorption tower downstream of each converter. The heat of HCl absorbtion in water is removed using an appropriate tubular cooler, cooled with portions of the brine stream 116, and acid is discharged at 40° C., approximately. In this way the distribution of chlorine and hydrogen amongst the HCl converters may be used to control the rate of acid addition, which is preferred for the large flows involved in this example, compared to dispensing aqueous acid using metering pumps, an alternative which might have been preferred for a much smaller-scaled example.

The gases used in Step 13 derive from the following sources:
(a) waste gas passing downstream of chlorine liquefaction (not shown in the figure because the process is well known); this gas contains hydrogen, nitrogen, carbon monoxide and carbon dioxide as well as chlorine, but contains less than 4% hydrogen and may be safely handled.

(b) waste gas from the HCl absorbers, composed chiefly of hydrogen and HCl, but little oxygen (not shown).

(c) additional HCl and chlorine cell gas if required (shown as streams 187 and 185 respectively).

The process of Step 13 requires these gases to react chemically with the carbonate solids from the stream 225 in the presence of water.

The apparatus of Step 13 consists preferably of continuous rotary vacuum precoat filters which, in batch or continuous mode of operation, provide two stages of recovery of washwater. The operation of Step 13 consists first in filtering some of the slurry (225) from Step 1 through the porous outer surface of a rotating drum in which a layer or "precoat" of insoluble finely-divided solids such as diatomaceous earth has been uniformly formed by filtration, which is partially immersed in the slurry to be filtered while a partial vacuum is maintained within the drum by exhausting the air within it using a water-sealed rotary vacuum pump (such as one manufactured by Nash Engineering of Norwalk, Conn.). The filtrate (214) is pumped to waste, as indicated in the figure. The solids form a porous layer (or "filter cake") uniformly over the precoat material. In the course of drum rotation, that portion of the filter cake which has risen above the slurry, and has been drained of filtrate, is subjected to spraying with washwater ((118), which is permeate from Step 4), is suitable) to reduce its salt content, and the used washwater is recycled to Step 1 (not shown) in any suitable way.

Next, the filter cake is sprayed with permeate from Stage 4, while the gases laden with chlorine and hydrogen chloride from sources indicated above are admitted to the spray chamber while continuing to maintain the partial vacuum within the filter drum. The following components—hydrogen, nitrogen, air, and carbon dioxide (227) including that generated by reaction between the filter cake and the aqueous acids of the washwater pass to the vacuum pump. The washwater from this step is the reagent stream (177) which passes to the product water. Without alteration of principle, a surplus of the reagent (177) may be produced by adding more chlorine, and may be sold for use as a sterilizing agent; this procedure releases additional carbon dioxide gas to Step 14.

Filter cake which is not dissolved as a result of producing the reagent 177 may be stripped from the precoat surface by suitable techniques which are well-known, for example, a stationary knife stretching the length of the drum, the edge of which penetrates the filter cake to just above the precoat interface with the filter cake, separates the filter cake from the precoat so that unused filter cake may pass to 214 as shown in the diagram. Step 14 is preferably conducted in two parts, the first of which takes place in the vacuum pump of Step 13, in which carbon dioxide released by the dissolution of filter cake in aqueous acid is dissolved in a caustic soda aqueous solution, which derives from stream 188 and is used as makeup for the fluid which recirculates at the tips of the water-sealed pump rotor while recovering aqueous sodium carbonate from the stream of compressed gas which issues therefrom (not shown).

The second part of Step 14 takes place in a conventional absorbtion tower in which gases containing carbon dioxide, released from burning auxiliary fuel in a waste heat boiler, are absorbed during their vertical discharge through the tower, countercurrent to a downflowing aqueous solution which contains caustic soda and sodium carbonate, and which recirculates. The tower may be of any suitable cross-section such as cylindrical or rectangular and of any height suited to the required effectiveness intended to be attained for absorbtion of carbon dioxide. It contains an open packing or lattice-work filling over which the recirculating aqueous solution is distributed evenly by spray at the top of the packing. A catch-basin beneath the packing collects the aqueous solution passing into it from the packing, and also the aqueous sodium carbonate recovered from the vacuum pump of Step 13 as discussed hereinabove.

Aqueous caustic soda from 188 is also added as makeup to the liquid being sprayed over the packing of the tower, as outlined hereinabove. The reagent stream (130) which passes to Step 7 is a portion of the liquid which recycles to the said sprays; the other portion (131) contains sufficient aqueous caustic soda required to maintain a pH of 9.5 (range 8.5 to 10) in the precipitating liquid of Step 7.

In the step 20 the product water of the process results by dissolving the calcium carbonate stream 135 in the permeate 122 (the unused portion of 117, which is 221, has zero volume in this example), adding the distillate stream 220 and the reagent 177 which is an aqueous solution of the chloride and hypochlorite of calcium. The potable specifications of neutrality (e.g., pH in the range of 7 to 7.5) are in this way reached with minimal adjusting additions of mineral acid or base (not shown).

The accompanying Table 1 summarizes the daily flows of water and dissolved salt components, referenced in each case to the flows marked on the diagram.

TABLE 1

| Line Number from FIG. 1 | FLOW RATE (IN METRIC TONS DAILY) OF DISSOLVED SOLIDS | | | | | | | | | |
|---|---|---|---|---|---|---|---|---|---|---|
| | | CATIONS | | | | ANIONS | | | | |
| | Water | Sodium | Potassium | Calcium | Magnesium | Chloride | Sulphate | Bicarbonate | Silicate | Phosphate | Suspended Solids |
| 100 | 1,400,000 | 18,897 | 699 | 721 | 2,269 | 33,830 | 4,898 | 244 | 15 | 0.01 | 29 |
| 101 | 272 | 104 | 3 | | | 4 | | | | | |
| 102 | 300 | 115 | 3 | | | 4 | | | | | |
| 103 | 300 | | | | | | | | | | |
| 104 | — | | | | | | | | | | |
| 105 | 2,613 | 35 | 1 | 180 | 4 | 63 | 9 | 244 | 15 | 0.01 | 15 |
| 106 | 2,556 | 34 | 1 | 176 | 4 | 62 | 9 | 239 | 15 | 0.01 | 15 |
| 107 | 644,516 | 18,781 | 693 | 717 | 2,268 | 33,486 | 4,894 | 239 | 15 | 0.01 | 15 |
| 108 | 1,397,387 | 18,966 | 702 | 541 | 2,265 | 33,771 | 4,889 | — | — | — | 14 |
| 109 | — | | | | | 40 | | | | | |
| 110 | 1,397,387 | 18,966 | 702 | 541 | 2,265 | 33,771 | 4,889 | | | | 14 |
| 111 | 28 | | | | | | | | | | |

TABLE 1-continued

| Line Number from FIG. 1 | FLOW RATE (IN METRIC TONS DAILY) OF DISSOLVED SOLIDS | | | | | | | | | |
|---|---|---|---|---|---|---|---|---|---|---|
| | CATIONS | | | | ANIONS | | | | | |
| | Water | Sodium | Potassium | Calcium | Magnesium | Chloride | Sulphate | Bicarbonate | Silicate | Phosphate | Suspended Solids |
| 112 | — | | | | | 32 | | | | | |
| 113 | | | | | | 72 | | | | | |
| 114 | 64 | | | | | | | | | | |
| 115 | 1,407,387 | 19,015 | 700 | 542 | 2,268 | 33,855 | 4,896 | | | | |
| 116 | 641,687 | 18,723 | 691 | 538 | 2,256 | 33,372 | 4,868 | — | — | — | 14 |
| 117 | 765,700 | 296 | 9 | 4 | 12 | 483 | 27 | — | — | — | — |
| 118 | 100 | | | | | | | | | | |
| 119 | | | | | | | | | | | |
| 120 | 765,600 | 296 | 9 | 4 | 12 | 483 | 27 | | | | |
| 121 | 34,000 | 169 | 5 | 4 | 11 | 286 | 24 | | | | |
| 122 | 765,600 | 123 | 4 | — | 1 | 196 | 4 | | | | |
| 123 | — | | | | | 5 | | | | | |
| 124 | 10,000 | 49 | 2 | 1 | 3 | 84 | 7 | | | | |
| 125 | 24,000 | 119 | 4 | 3 | 8 | 202 | 17 | | | | |
| 126 | 24,010 | 120 | 4 | 3 | 8 | 204 | 17 | | | | |
| 127 | 23,000 | 1 | — | — | — | 1 | — | | | | |
| 128 | 1,010 | 119 | 4 | 3 | 8 | 202 | 17 | | | | |
| 129 | 27 | 5 | 0.1 | | | | | 4 | | | |
| 130 | 14 | 2 | | | | | | 4 | | | |
| 131 | 13 | 3 | 0.1 | | | | | | | | |
| 132 | 1,003 | 124 | 4.1 | — | 8 | 202 | 17 | 4 | | | |
| 133 | 34 | | | 3 | | | | 4 | | | |
| 134 | 34 | | | | | | | | | | |
| 135 | | | | 3 | | | | 4 | | | |
| 136 | 217 | 20 | 1 | 3 | 8 | 43 | 17.5 | | | | |
| 137 | 1,858 | 190 | 6 | — | 48 | 366 | 103 | | | | |
| 138 | 820 | 0.3 | | | | 0.5 | 0.2 | | | | |
| 139 | 1,038 | 189.7 | 6 | | 48 | 365.6 | 102.8 | | | | |
| 140 | 10 | | | | | | | | | | |
| 141 | 10 | 115 | 3 | | | 181 | | | | | |
| 142 | 1,028 | 73.7 | 2.4 | | 48 | 192 | 103 | | | | |
| 143 | 855 | 66 | 2 | | 40 | 159 | 85 | | | | |
| 144 | 173 | 7.7 | 0.4 | | 8 | 24.6 | 17.5 | | | | |
| 145 | 10 | .1 | | | | 1 | 0.3 | | | | |
| 146 | 24 | | | | | | | | | | |
| 147 | 803 | 74 | 3 | | | 122 | | | | | |
| 148 | 837 | 189 | 6 | | | 303 | | | | | |
| 149 | 8 | 3 | | | | | | | | | |
| 150 | | | | | Trace | | | | | | |
| 151 | 0.1 | 0.02 | | | | | 0.04 | | | | |
| 152 | 845.1 | 192 | 9 | | Trace | 303 | | | | | |
| 153 | | | | | Trace | 303 | 0.04 | | | | |
| 154 | | | | | | 1 | | | | | |
| 155 | 0.1 | 0.02 | | | Trace | | 0.04 | | | | |
| 156 | 845 | 192 | 9 | | | 303 | | | | | |
| 157 | 813 | 76 | 3 | | | 121 | | | | | |
| 175 | 108 | 8 | | | | 12 | | | | | |
| 176 | 338 | 21 | | 7 | 8 | 32 | 17 | | | | |
| 177 | 44 | | | 4 | | 7 | | | | | |
| 178 | 10 | 1 | | | | 1 | | | | | |
| 179 | — | | | | | | | | | | |
| 180 | 16 | | | | | | | | | | |
| 181 | 16 | | | | | 176 | | | | | |
| 182 | 8 | | | | | 84 | | | | | |
| 183 | 8 | | | | | 84 | | | | | |
| 184 | 8 | | | | | 92 | | | | | |
| 185 | — | | | | | 4 | | | | | |
| 186 | 8 | | | | | 91 | | | | | |
| 187 | 100 | | | | | | | | | | |
| 188 | 14 | 2 | 0.01 | | | | | | | | |
| 189 | 23,821 | 1 | | | | 1 | | | | | |
| 190 | 768 | 72 | .3 | | | 115 | 2 | | | | |
| 191 | 947 | 190 | 7 | 3 | 8 | 316 | 17 | | | | |
| 192 | 118 | 10 | | 13 | | 43 | | | | | |
| 193 | 150 | 12 | | 7 | | 19 | 17 | | | | |
| 194 | 915 | 189 | 7 | 9 | 8 | 340 | 2 | | | | |
| 195 | 142 | 26 | 1 | | | | | | | | |
| 196 | 80 | 1 | | | 8 | 1 | | | | | |
| 197 | 977 | 214 | 8 | 9 | | 339 | 2 | | | | |
| 198 | 2 | | | | | | | 14 | | | |
| 199 | 110 | 8 | | 9 | | 12 | | 14 | | | |
| 200 | 919 | 206 | 8 | | | 327 | 2 | | | | |
| 201 | 2 | 1 | | 3 | | 1 | 6 | | | | |
| 202 | 901 | 77 | 3 | | | 123 | 2 | | | | |
| 203 | 15 | 1 | | | | 2 | | | | | |
| 204 | 9 | | | | | | | | | | |

TABLE 1-continued

| Line Number from FIG. 1 | FLOW RATE (IN METRIC TONS DAILY) OF DISSOLVED SOLIDS | | | | | | | | | |
|---|---|---|---|---|---|---|---|---|---|---|
| | CATIONS | | | | ANIONS | | | | | |
| | Water | Sodium | Potassium | Calcium | Magnesium | Chloride | Sulphate | Bicarbonate | Silicate | Phosphate | Suspended Solids |
| 205 | 9 | | | | | | | | | | |
| 206 | 16 | | | | | 204 | | | | | |
| 207 | 8 | | | | | 97 | | | | | |
| 208 | 17 | | | | | 107 | | | | | |
| 209 | 188 | 3 | | | | 5 | | | | | |
| 210 | 642,232 | 18,746 | 691 | 545 | 2,264 | 33,408 | 4,885 | | | | 14 |
| 211 | 14,110 | 412 | 15 | 12 | 50 | 735 | 107 | | | | |
| 212 | 14,110 | 412 | 15 | 12 | 50 | 735 | 107 | | | | 14 |
| 213 | | | | | | | | | | | |
| 214 | 56 | 1 | | | | 2 | | | | | |
| 215 | 207 | 7.7 | 0.4 | | 8 | 24.6 | 17.5 | | | | |
| 216 | 8 | | | | | | | | | | |
| 217 | 8 | | | | | | | | | | |
| 218 | 855 | 66 | 2 | | 40 | 164 | 85 | | | | |
| 219 | 18 | | | | | | | | | | |
| 220 | 23,451 | 1 | | | | 1 | | | | | |
| 221 | — | | | | | 26 | | | | | |
| 222 | 118 | 14 | | | | 19 | | | | | |
| 223 | 345 | | | | | | | | | | |
| 224 | 23,476 | 1 | | | | 1 | | | | | |
| 225 | 56 | 1 | | 4 | | 1 | | 5 | | | |
| 226 | 188 | 3 | | 13 | | 5 | | 18 | | 1 | 1 |
| 227 | 2 | | | | | | | 5 | | | |
| 228 | 6 | | | | | | | 18 | | | |
| 229 | | | | | | | | | | | |
| 230 | 755,200 | 125 | 4 | 3 | 1 | 204 | 6 | 4 | | | |

What is claimed is:

1. A process for the desalination of unpotable feedwater comprising the steps of:
   (a) decarbonating said feedwater by adding sodium hydroxide to said feedwater in a quantity sufficient to raise the pH level to at least about 9.5 but no greater than 11 to thereby convert substantially bicarbonate to carbonate and to precipitate said carbonate substantially as calcium carbonate in a sludge and a supernatant saline stream;
   (b) separating the thus-formed sludge from the supernatant saline stream in a clarifier;
   (c) subjecting the separated supernatant saline stream to first stage reverse osmosis across a membrane to produce a first stage permeate stream and a first stage sodium chloride brine stream, whereby multivalent cations at least are substantially rejected into the latter and a portion of the monovalent cations and of the water from the saline feed are preferentially retained as first stage permeate; and
   (d) subjecting the first stage permeate stream to second stage reverse osmosis to form a second stage permeate stream of potable water and a second stage sodium chloride brine stream.

2. The process of claim 1 together with the steps of:
   (e) separating the second stage brine stream into a more concentrated sodium chloride stream and a less concentrated sodium chloride stream; and
   (f) recovering said less concentrated sodium chloride stream as a stream.

3. The process of claim 2 in which the separation step (e) is performed by distillation.

4. The process of claim 2 in which the separation step (e) is performed by freeze crystallization of ice.

5. The process of claim 2 together with the step of:
   (g) electrolyzing said more concentrated sodium chloride stream to form an aqueous sodium hydroxide stream and a hydrochloric acid stream.

6. The process of claim 2 together with the steps of:
   (g) removing sufficient additional water from the more concentrated sodium chloride stream so as to precipitate crystals of sodium chloride;
   (h) separating the sodium chloride crystals from the more concentrated sodium chloride stream;
   (i) dissolving the separated sodium chloride crystals in water and in weak sodium chloride brine to form an aqueous brine nearly saturated with sodium chloride; and
   (j) electrolyzing said nearly saturated aqueous brine from step (i) to form an aqueous sodium hydroxide stream, a hydrochloric acid stream, and a weak sodium chloride brine recycle stream, at least a portion of which is utilized as the source of weak sodium chloride brine fed to step (i).

7. The process of claim 6 in which prior to step (g), the following steps are performed;
   (k) the more concentrated sodium chloride stream from step (e), containing dissolved calcium, is mixed with soluble carbonate under alkaline conditions to precipitate calcium carbonate; and
   (l) the calcium carbonate precipitate is separated from the more concentrated sodium chloride stream.

8. The process of claim 2 in which prior to step (e), the following steps are performed:
   (g) the second stage sodium chloride brine stream from step (d), containing dissolved calcium, is mixed with soluble carbonate under alkaline conditions to precipitate calcium carbonate; and
   (h) the calcium carbonate precipitate is separated from the second stage sodium chloride brine stream.

9. The process of claim 2 together with the steps of:
   (g) mixing the more concentrated sodium chloride stream with soluble calcium cations under acid conditions;
   (h) separating from the more concentrated sodium chloride stream a precipitate of calcium sulphate;

(i) mixing the more concentrated sodium chloride stream separated in step (h) with soluble carbonate under alkaline conditions;

(j) separating a precipitate of insoluble carbonates from the more concentrated sodium chloride stream of step (i); and (k) electrolyzing the sodium chloride brine separated in step (j) to form an aqueous sodium hydroxide stream and a hydrochloric acid stream.

10. The process of claim 9 together with the steps of:
(l) adding soluble barium cation to the separated sodium chloride stream of step (h); and
(m) separating a precipitate of barium sulphate from the sodium chloride stream of step (l).

11. The process of claim 10 together with the step of:
(o) adding sodium hydroxide to the sodium chloride stream separated in step (m) to form a precipitate of magnesium hydroxide.

12. The process of claim 9 together with the steps of:
(l) adding sodium hydroxide to the sodium chloride stream separated from step (j); and
(m) separating from the sodium chloride stream of step (l) a precipitate of magnesium hydroxide.

13. The process of claim 5 in which at least a portion of the aqueous sodium hydroxide stream formed in step (g) is used as the source of sodium hydroxide in step (a).

14. The process of claim 6 in which at least a portion of the aqueous sodium hydroxide stream formed in step (j) is used as the source of sodium hydroxide in step (a).

15. The process of claim 9 in which at least a portion of the aqueous sodium hydroxide stream formed in step (k) is used as the source of sodium hydroxide in step (a).

16. A process for the desalination of unpotable feedwater comprising the steps of:
(a) decarbonating said feedwater by adding sodium hydroxide to said feedwater in a quantity sufficient to raise the pH level to at least about 9.5 but no greater than 11 to thereby convert substantially bicarbonate to carbonate and to precipitate said carbonate substantially as calcium carbonate in a sludge and a supernatant saline stream;
(b) clarifying said supernatant saline stream by filtration to remove suspended solids and form a filtrate;
(c) adding acid to the filtrate to lower its pH level;
(d) subjecting the acidulated filtrate to first stage reverse osmosis across a membrane to produce a first stage permeate stream and a first stage brine stream whereby multivalent cations at least are substantially rejected into the latter and a portion of the monovalent cations and of the water from the saline feed are preferentially retained as first stage permeate;
(e) subjecting at least some of the first stage permeate stream to second stage reverse osmosis, to form a second stage permeate stream of potable water and a second stage chloride brine stream;
(f) separating the second stage sodium chloride brine stream into a more concentrated sodium chloride stream and a less concentrated sodium chloride stream; and
(g) recovering as purified water the said less concentrated stream from step (f) and the second stage from step (e).

17. The process of claim 16 in which a coagulant aid is added to the feedwater prior to filtration in step (b) to form coagulant.

18. The process of claim 16 in which some of said first stage permeate stream from step (d) is recovered as a purified water stream.

19. The process of claim 16 in which the separation step (f) is performed by distillation.

20. The process of claim 16 in which the separation step (f) is performed by crystallization of ice.

21. The process of claim 16 together with the step of:
(h) electrolyzing the said more concentrated sodium chloride stream to form an aqueous sodium hydroxide stream and a hydrochloric acid stream.

22. The process of claim 16 together with the steps of:
(h) removing sufficient additional water from the more concentrated sodium chloride stream so as to precipitate crystals of sodium chloride;
(i) separating the sodium chloride crystals from the more concentrated sodium chloride stream;
(j) dissolving the separated sodium chloride crystals in water and in weak sodium chloride brine to form an aqueous brine nearly saturated with sodium chloride; and
(j) electrolyzing said nearly saturated aqueous brine from step (j) to form an aqueous sodium hydroxide stream, a hydrochloric acid stream, and a weak sodium chloride brine recycle stream, at least a portion of which is utilized as the source of weak sodium chloride brine fed to step (j).

23. The process of claim 22 in which prior to step (h), the following steps are performed:
(l) the more concentrated sodium chloride stream from step (f), containing dissolved calcium, is mixed with soluble carbonate under alkaline conditions to precipitate calcium carbonate; and
(m) the calcium carbonate precipitate is separated from the more concentrated sodium chloride stream; and
(n) the more concentrated sodium chloride stream from (m) is acidulated slightly with mineral acid.

24. The process of claim 16 in which prior to step (f), the following steps are performed:
(h) the second stage sodium chloride brine stream from step (e), containing dissolved calcium, is mixed with soluble carbonate under alkaline conditions to precipitate calcium carbonate;
(i) the calcium carbonate precipitate is separated from the second stage sodium chloride brine stream; and
(j) the second stage sodium chloride brine stream from (i) is acidulated slightly.

25. The process of claim 16 together with the steps of:
(h) mixing the more concentrated sodium chloride stream with soluble calcium cations under acid conditions;
(i) separating from the more concentrated sodium chloride stream a precipitate of calcium sulphate;
(j) mixing the more concentrated sodium chloride stream separated in step (h) with soluble carbonate under alkaline conditions;
(k) separating a precipitate of insoluble carbonates from the more concentrated sodium chloride stream of step (j); and
(l) electrolyzing the sodium chloride brine separated in step (k) to form an aqueous sodium hydroxide stream and a hydrochloric acid stream.

26. The process of claim 24 together with the steps of:
(k) adding soluble barium cation to the separated sodium chloride stream of step (i); and
(l) separating a precipitate of barium sulphate from the sodium chloride stream of step (k).

27. The process of claim 26 together with the step of:
(m) adding sodium hydroxide to the sodium chloride stream separated from step (l) to form a precipitate of magnesium hydroxide.
28. The process of claim 25 together with the steps of:
(m) adding sodium hydroxide to the sodium chloride stream separated from step (k); and
(n) separating from the sodium chloride stream of step (m) a precipitate of magnesium hydroxide.

29. The process of claim 21 in which at least a portion of the hydrochloric acid stream formed in step (h) is used as the source of acid in step (c).
30. The process of claim 22 in which at least a portion of the hydrochloric acid stream formed in step (k) is used as the source of acid in step (c).
31. The process of claim 25 in which at least a portion of the hydrochloric acid stream formed in step (l) is used as the source of acid in step (c).

* * * * *